No. 737,614. PATENTED SEPT. 1, 1903.
H. HALSEY.
ELECTRIC BATTERY.
APPLICATION FILED DEC. 6, 1902.
NO MODEL.
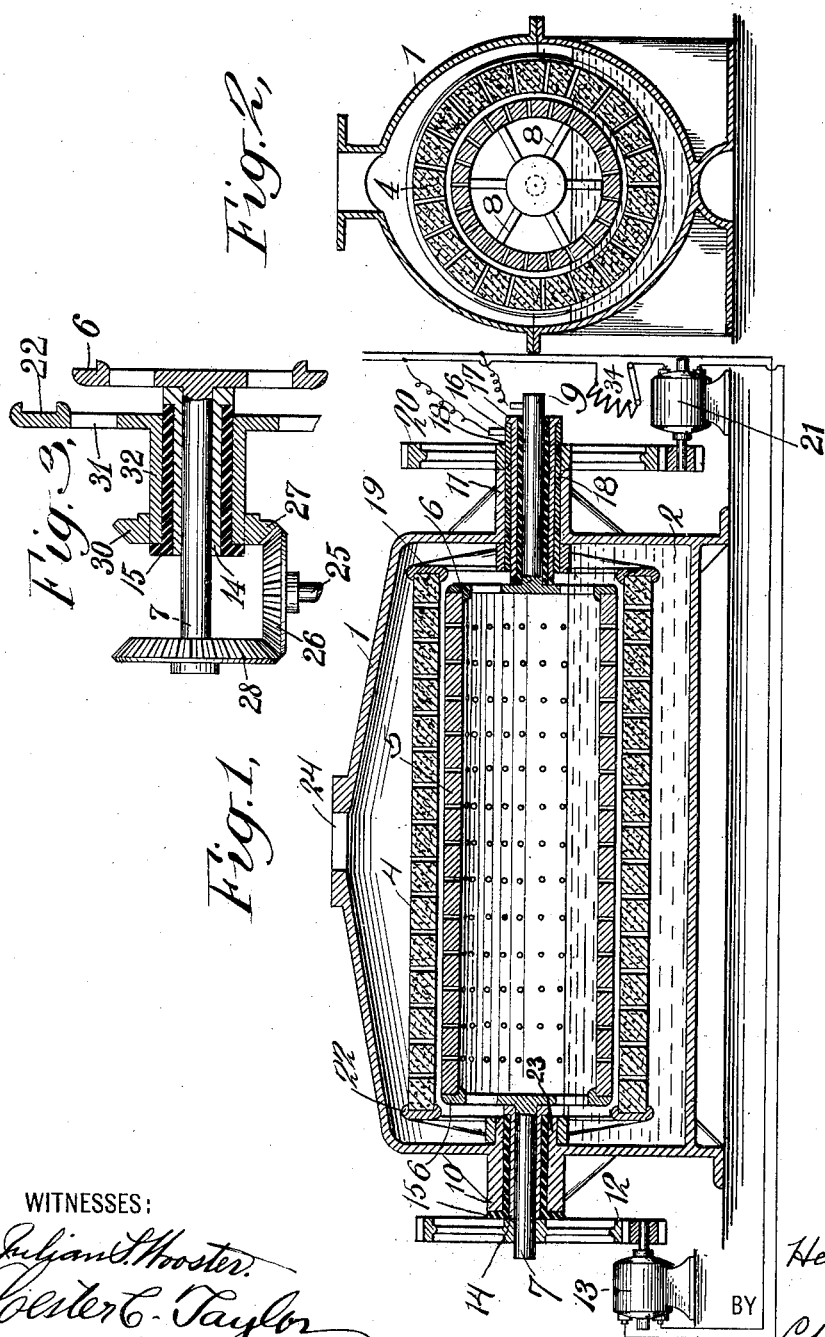
WITNESSES:
INVENTOR
Henry Halsey
BY
C. W. Edwards
ATTORNEY No. 737,614. Patented September 1, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 737,614, dated September 1, 1903.

Application filed December 6, 1902. Serial No. 134,143. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to electric batteries, and especially to that class of batteries wherein the elements are movable to prevent polarization.

The object of the invention is to provide a battery of simple mechanical construction which shall be of high electrical efficiency.

In batteries of this general class heretofore described by me one or more of the elements of like polarity are movable in the electrolyte. In the present application both elements are movable, preferably in opposite directions. By this construction I am enabled to secure the same effect as if one element were fixed and the other movable at a high speed, and I obviate the necessity of mechanical stirrers to keep the electrolyte uniform in composition throughout. It is found that where only one element is movable a high speed is necessary in order to secure the maximum output. I have found by experiment that less power is consumed in driving two elements in opposite directions at low speeds than in driving one element at a relatively high speed. A better circulation of the electrolyte is secured, so that its strength is everywhere uniform, and therefore fluctuations in the output, due to uneven strength and precipitates, are prevented.

Reference being had to the accompanying drawings, Figure 1 is a longitudinal section of my improved battery. Fig. 2 is a transverse section, and Fig. 3 is a sectional view of a modified driving connection.

In the drawings, 1 represents a separable casing in which is contained the electrolyte 2. The upper half can be removed to permit access to the elements. In opposite ends of the casing are formed bearings 10 11, in which the elements 4 and 5 are rotatably supported. The element 5 is cylindrical and may be perforated, so as to increase the active surface and permit circulation of the electrolyte. The element 5 is attached to rings 6, so as to be detachable for renewal. The rings 6 are attached to short shafts 7 and 9 by arms 8. Attached to the outer end of shaft 7 is a gear-wheel 12, which is driven from a motor 13. The shaft 7 rotates in a sleeve 14, which is attached to the bearing 10 through a sleeve 15 of suitable insulating material. At the other end the sleeve 17 and the insulation-sleeve 16 are attached to the shaft 9 and rotate within the hollow shaft 18, carrying at one end the ring 19 and the element 4 and at the other end the gear-wheel 20, which is driven from a motor 21. The element 4 may be perforated and is attached to the rings 19 and 22 in the same manner as the element 5 is attached to the rings 6. The ring 22 has a bearing on an inward extension 23 of the bearing 10.

24 is a vent for the escape of any gases that may be formed.

The connections may be made from the shafts 9 and 18 through brushes, as shown; but I do not limit myself to any specific manner of taking current from the cell.

In Fig. 3 I have shown a construction in which only one motor is used. 25 is a shaft connected to a motor and carrying the gear 26, which meshes with the gear 28 on the shaft 7. The gear 26 also meshes with a gear 27 on a hollow shaft which carries the ring 22. The sleeve 14 and insulation 15 rotate with the hollow shaft 32, which is carried by bearings in the casing.

I have shown the motors in series on a shunt from the line; but any other arrangement may be used. Any suitable device, as the rheostat 34, may be used for controlling the output by varying the speed of one or both motors.

I do not limit myself to any particular shape of elements, as they might, for instance, be disks. The essential feature of my invention is the mounting of the elements, of whatever form, so as to be movable in opposite directions.

Having thus described my invention, I declare that what I claim as new, and desire to secure by Letters Patent, is—

1. In a battery, the combination with a casing and an electrolyte, of a plurality of elements, movable in opposite directions, substantially as described.

2. In a battery, the combination with a casing and an electrolyte, of a plurality of elements one within the other, and means for moving them in opposite directions, substantially as described.

3. In a battery, the combination with a casing and an electrolyte, of a plurality of concentric elements, mounted one within the other, and means for moving them in opposite directions.

4. In a battery, the combination of a plurality of elements, one being rotatably mounted in the casing, and another being rotatably mounted on the first-named element, and means for rotating them in opposite directions.

5. In a battery, the combination of a plurality of elements, a hollow shaft carrying one element, a shaft carrying the other element and mounted in the hollow shaft, and means for rotating the two elements in opposite directions.

6. In a battery, the combination of a plurality of elements movable in opposite directions and means for varying the speed of the elements, substantially as described.

In testimony whereof I affix my signature in presence of two witnesses.

HENRY HALSEY.

Witnesses:
JULIAN S. WOOSTER,
HENRY BEST.